United States Patent
Krappe et al.

(10) Patent No.: US 7,312,260 B2
(45) Date of Patent: Dec. 25, 2007

(54) EPOXIDE ADDUCTS AND THEIR SALTS AS DISPERSANTS

(75) Inventors: Udo Krappe, Emmerich (DE); Karlheinz Haubennestel, Wesel (DE); Andrea Pentzek, Geldern (DE); Peter Matthee, Herdecke (DE)

(73) Assignee: BYK-Chemie GmbH, Wesel (DE)

( * ) Notice: Subject to any disclaimer, the term of this patent is extended or adjusted under 35 U.S.C. 154(b) by 345 days.

(21) Appl. No.: 10/862,111

(22) Filed: Jun. 4, 2004

(65) Prior Publication Data

US 2005/0020735 A1   Jan. 27, 2005

(30) Foreign Application Priority Data

Jun. 6, 2003   (DE)  ................................ 103 26 147

(51) Int. Cl.
 *C08L 63/00* (2006.01)
 *C08G 65/26* (2006.01)
 *B01F 17/00* (2006.01)

(52) U.S. Cl. ............... 523/414; 523/400; 528/119; 528/121; 528/421; 528/422

(58) Field of Classification Search ............ None
See application file for complete search history.

(56) References Cited

U.S. PATENT DOCUMENTS

| | | | |
|---|---|---|---|
| 3,870,666 A | 3/1975 | Becker .................... 260/21 |
| 3,945,964 A | 3/1976 | Hastings et al. ..... 260/29.6 NR |
| 4,051,195 A | 9/1977 | McWhorter |
| 4,197,389 A | 4/1980 | Becker et al. ............. 528/103 |
| 4,485,229 A | 11/1984 | Waddill et al. ............ 528/111 |
| 4,710,561 A | 12/1987 | Tominaga et al. ......... 528/111 |
| 4,777,195 A | 10/1988 | Hesse et al. ............... 523/461 |
| 4,795,796 A | 1/1989 | Haubennestel et al. ...... 528/28 |
| 4,892,764 A | 1/1990 | Drain et al. ............... 428/34.5 |
| 4,942,213 A | 7/1990 | Haubennestel et al. ...... 528/28 |
| 5,057,348 A | 10/1991 | Drain et al. ................. 428/76 |
| 5,070,159 A | 12/1991 | Dietz et al. ................. 525/504 |
| 5,128,393 A | 7/1992 | Peng et al. ................. 523/402 |
| 5,305,601 A | 4/1994 | Drain et al. .................. 60/255 |
| 5,424,340 A | 6/1995 | Pfeil et al. |
| 5,489,630 A * | 2/1996 | Walker ...................... 523/404 |
| 5,648,409 A | 7/1997 | Arora et al. ................ 523/404 |
| 5,908,902 A | 6/1999 | Pfeil et al. .................. 525/524 |
| 6,506,821 B1 | 1/2003 | Huver et al. ............... 523/404 |
| 6,552,091 B1 | 4/2003 | Boinowitz et al. ........... 516/30 |
| 6,689,731 B2 | 2/2004 | Esselborn et al. .......... 510/286 |
| 2002/0011183 A1 | 1/2002 | Esselborn et al. ......... 106/400 |

FOREIGN PATENT DOCUMENTS

| | | |
|---|---|---|
| CA | 1317303 | 5/1993 |
| DE | 2332177 | 2/1974 |
| DE | 3623296 | 1/1988 |
| DE | 3623297 | 1/1988 |
| DE | 3643007 | 6/1988 |
| DE | 4309639 | 9/1994 |
| DE | 19940797 | 3/2001 |
| DE | 10029648 | 2/2002 |
| EP | 0000605 A1 | 2/1979 |
| EP | 0245559 A2 | 11/1987 |
| EP | 0270126 A2 | 6/1988 |
| EP | 0318999 A2 | 6/1989 |
| EP | 0747413 A2 | 12/1996 |
| EP | 1078946 A1 | 2/2001 |
| GB | 1408105 | 10/1975 |
| WO | WO-9620971 A1 | 7/1996 |

OTHER PUBLICATIONS

"PCT International Search Report", from International Application No. PCT/US95/16232, dated Mar. 26, 1996, 1 page.

\* cited by examiner

*Primary Examiner*—Michael J. Feely
(74) *Attorney, Agent, or Firm*—Schwegman, Lundberg & Woessner P.A.

(57) ABSTRACT

The invention relates to addition compounds suitable for use as wetting agents and dispersants and obtainable by reacting monofunctional or polyfunctional aromatic epoxides with polyoxyalkylenemonoamines having a number-average molecular weight of >400 g/mol, one primary or secondary amino group and at least 4 ether oxygen atoms per molecule, from 90 to 100% of the epoxide groups of the starting material having undergone reaction, the weight fraction of aromatic groups in the addition compounds being not more than 50% and the addition compounds containing per molecule at least one amino group on which salts can be formed, or being present as a salt. The invention also relates to a process for preparing the addition compounds, to their use as wetting agents and/or dispersants and to pigments or fillers coated with the addition compounds and to pigment pastes which comprise pigments, binders and the addition compounds of the invention.

11 Claims, No Drawings

EPOXIDE ADDUCTS AND THEIR SALTS AS DISPERSANTS

RELATED APPLICATIONS

The present application claims priority under 35 U.S.C. 119 to German Patent Application No. 103 26 147.8 filed Jun. 6, 2003, which is hereby incorporated by reference.

The present invention relates to reaction products of epoxides with specific amines, and their salts, as wetting agents and dispersants for pigments and fillers. This invention further relates to the process for preparing these reaction products and also to their use as wetting agents and dispersants for organic and inorganic pigments and also fillers in organic and aqueous systems, and to pulverulent or fibrous solids which are to be incorporated into liquid systems and have been coated with such dispersants.

The aforementioned reaction products are particularly suitable for preparing pigment concentrates (pigment pastes) and for stabilizing particulate solids in binders, coating materials, plastics and polymer mixtures. The reaction products reduce the viscosity of such systems, improve flow properties and storage stabilities and increase the colour strength.

In order to be able to incorporate solids into liquid media, high mechanical forces are necessary. It is usual to use dispersants in order to lower these dispersing forces and in order to minimize the total energy input into the system that is necessary for deflocculation of the particulate solids and hence also to minimize the dispersing time. These dispersants are generally surface-active substances of anionic, cationic or neutral structure. These substances, in a small amount, are either applied directly to the solid or added to the dispersing medium. It is also known that even after complete deflocculation of the agglomerated solids into primary particles, after the dispersing operation, instances of reagglomeration occur, thereby partly or completely nullifying the dispersing work. As a consequence of inadequate dispersing or as a result of reagglomeration there are unwanted effects such as an increase in viscosity in liquid systems, colour drift and loss of gloss in paints and coatings, and reduction in mechanical strength in plastics.

A multiplicity of different substances are presently used as dispersants for pigments and fillers. There is an overview of existing patent literature in EP-A-0 318 999. In addition to very simple compounds of low molecular mass, such as lecithin, fatty acids and their salts, and alkylphenol ethoxylates, for example, complex structures too are used as dispersants.

The systems used as wetting agents and dispersants include reaction products of epoxides. For instance, U.S. Pat. Nos. 5,128,393 and 4,710,561 describe reaction products of monoepoxides with aminoimidazolines. U.S. Pat. No. 5,128,393 describes the use of reaction products of monoepoxides or polyepoxides with amines containing an imidazoline group as dispersants. U.S. Pat. No. 5,128,393, U.S. Pat. No. 4,710,561 and U.S. Pat. No. 5,128,393 can be regarded as state of the art in the field of epoxy-amine adducts.

DE-A-3623296 and DE-A-3623297 describe the use of polyepoxide/amine mixtures and their salts as dispersants for pigments principally in organic media, the polyepoxides being novolaks and the amines being aliphatic, aromatic and/or heterocyclic amines of low molecular weight.

(Poly)epoxides have long been known as constituents of binders. Such systems are often contacted with amine curing components and cured. More recent publications in this field describe specific amines or amine-epoxide adducts as curatives for epoxy resins. For instance, self-dispersible curable epoxy resins obtained by reacting aromatic polyepoxides with polyoxyalkyleneamines in an equivalent ratio (epoxy equivalent:amine equivalent) of between 1:0.1 and 1:0.28 are found in U.S. Pat. No. 6,506,821 B1. Since the epoxide group content of such compounds is considerable, they are unsuitable as wetting agents and dispersants, since the pigment concentrates prepared are not stable on storage. Similar products are also described in U.S. Pat. No. 3,945,964 and U.S. Pat. No. 4,485,229 as aqueous emulsifiers. Additionally, U.S. Pat. No. 4,051,195 and EP-A-0 245 559 describe crosslinking agents based on epoxides with polyoxyalkyleneamines which have additionally been reacted with acrylic esters in a Michael reaction. Since these products too are intended to function as a crosslinker component, in these examples there is a high density of crosslinkable groups, which render the products unsuitable for use as dispersants. This restriction also applies to products according to WO 96/20971, which describes reaction products of epoxy resins with amine-epoxide adducts as self-emulsifying curable epoxy resins. The aforementioned amine-epoxide adducts are reaction products of polyepoxides with a substoichiometric amount of polyoxyalkylenediamines. Polyoxyalkylenediamines as so-called modifying agents are also used in DE-A-43 09 639. EP-A-0 000 605 and DE 23 32 177/GB-A-1408105 describe readily water-dispersible modified amine adducts. Amine curatives used also include polyoxyalkyleneamines (which are sold, for example, under the trade mark Jeffamine by Huntsman Corporation). Wetting agents and dispersants based on defined adducts of polyoxyalkyleneamines and epoxides without free epoxide groups have to date, however, not been described.

EP-A-747 413 describes, as emulsifiers, reaction products of aliphatic polyols with epoxides containing at least two epoxide groups per ring. These compounds, then, do not carry any nitrogen atoms on which salts can be formed, and hence exhibit only a low affinity for pigments and fillers.

A feature common to all of the aforementioned dispersants is that they have each been developed only for a narrow field of use and can therefore be used only limitedly, especially in relation to their joint use in systems where there are stark differences in polarity.

In what are called universal tinting pastes, by which are meant pigment pastes used primarily in the architectural paint industry for tinting aqueous decorating paints or emulsion paints containing solvent or cosolvent, use has long been made of alkylphenol ethoxylates and/or the esters thereof with phosphoric acid as wetting agents and dispersants. In contrast to the epoxide adducts used above as dispersants, these substances are distinguished by broad compatibility in the binders used. However, these substances have been criticized on ecotoxicological grounds and in some states are already subject to considerable restrictions on their use.

As alternatives to the alkylphenol ethoxylates fatty alcohol ethoxylates and/or their esters with phosphoric acid are used for the preparation of tinting pastes. The positive properties of the alkylphenol ethoxylates in respect of pigment stabilization are not achieved in the majority of cases by the fatty alcohol ethoxylates. Moreover, the tendency to stabilize foam is an adverse side-effect of the fatty alcohol ethoxylates.

Besides the stated fatty alcohol ethoxylates and their derivatives block-copolymeric phosphoric esters and their salts (DE 100 29 648/US2002011183A1) and also polyalkylene oxides containing styrene oxides (DE 199 40 797/EP- A-1 078 946) are used as dispersants. These substances too, however, show weaknesses in compatibility with certain binder systems and also foam problems when pigment pastes are prepared.

The present invention is therefore based on the object of eliminating the above-described drawbacks of known dispersants, in other words, of developing dispersing additives which while effectively stabilizing pigments or fillers lower the millbase viscosity of the paints, pastes or polymeric formulations to a level such that they can be processed with a high degree of filling. At the same time, especially in the case of pigment pastes and filler pastes, broad compatibility must be ensured, in order to allow these systems to be used in numerous different binders and coating materials. Such pastes can be employed in apolar binders, such as a decorating paint based on long-oil alkyd, for example, and in polar systems such as aqueous emulsion paints. In addition, the dispersing additives of the invention allow the pastes, or the binders prepared using these pastes, to be mixed with one another without flocculation.

Surprisingly it has been found that addition products of aromatics-containing epoxides with special amines and/or their phosphoric ester salts meet the requirements described.

Accordingly, the present invention provides addition compounds which are suitable for use as wetting agents and dispersants and are obtainable by reacting (I) monofunctional or polyfunctional aromatic epoxides; with
(II) polyoxyalkylenemonoamines having a number-average molecular weight of >400 g/mol, one primary or secondary amino group and at least 4 ether oxygen atoms per molecule, wherein from 90 to 100% of the epoxide groups of the starting material having undergone reaction, the weight fraction of aromatic groups in the addition compounds being not more than 50% and the addition compounds containing per molecule at least one amino group on which salts can be formed, or being present as a salt.

Mixtures of the aforementioned addition compounds are also suitable as wetting agents and dispersants.

In the case of polyfunctional epoxides it is advantageous that on a molar average at least one epoxide group per molecule has been reacted with a polyoxyalkylenemonoamine and one or more further epoxide groups have been reacted with another epoxide-reactive compound. By this means it is possible to modify the properties of the wetting agents and dispersants of the invention and to tailor them optimally to their end use. The additional epoxide group or groups may have been reacted advantageously with a saturated or unsaturated carboxylic acid and/or hydroxy carboxylic acid, with an alcohol or with a primary or secondary amine.

Not only epoxides having two or more epoxide groups (polyepoxides), which have been reacted only with the polyoxyalkylenemonoamines, but also polyepoxides which have been reacted with both polyoxyalkylenemonoamines and other reactants, are subject to the proviso that the molar number of epoxide groups should always be the same as or less than the molar number of the groups which react with these epoxide groups (amino groups, for example, or mixtures of amino groups and, for example, carboxylic acid groups). The epoxide equivalent weight of the reaction products should theoretically go towards infinity and hence all of the epoxide groups should be reacted. Preferably more than 95% of the epoxide groups of the starting material should be reacted.

In a preferred embodiment, the addition compounds of the invention are in the form of ester salts of a phosphoric acid of the general formula $(HO)_{3-n}PO(OR^1)_n$, wherein n is 1 or 2; and $R^1$ is a straight-chain or branched alkyl radical having from 5 to 20 carbon atoms; an aryl or aralkyl radical having from 6 to 26 carbon atoms; a radical of an oxalkylated alcohol with a number-average molecular weight of between 100 and 5000 g/mol; a radical with at least one carboxylic ester group and a number-average molecular weight of between 400 and 5000 g/mol; or a radical with at least one urethane group and a number-average molecular weight of between 100 and 5000 g/mol.

The radical $R^1$ of the phosphoric esters is an essential constituent of one preferred embodiment of the dispersants of the invention and is characterized in that it comprises at least one ether oxygen (—O—) and/or one carboxylic ester function (—COO—) and/or one urethane group (—NH-COO—) and/or is an alkyl, aryl or aralkyl radical having more than 5 carbon atoms. The number-average molecular weight $M_n$ of the $R^1$ radical can be between 100 and 20,000 g/mol, preferably between 100 and 5000 g/mol, it being possible for some hydrogen atoms to be replaced by halogen atoms. The radical $R^1$ may additionally carry groups which behave inertly during the formation of the salt, such as the carboxyamide group (—NHCO—), non-activated double bonds or urea moieties (—NHCONH—). $R^1$ is preferably the radical of an oxalkylated and/or carboxylic-ester-containing monoalcohol. The molecular weight of such a radical $R^1$ is preferably in the range 200-5000 g/mol, since products with a lower or higher molecular weight have proven to be less effective. Moreover, radicals with a higher molecular weight are difficult to prepare and are usually not available commercially. Particular preference is given to radical $R^1$ molecular weights in the range between 300 and 2500 g/mol, since products with radicals which lie in this molecular weight range are easy to prepare and process and are highly effective. Very particular preference is given to phosphoric esters whose radical $R^1$ is an oxalkylated or carboxylic-ester-containing monoalcohol or an oxalkylated and carboxylic-ester-containing monoalcohol having an average molecular weight in the range 300-2500 g/mol.

The choice of the $R^1$ radical ensures appropriate compatibility of the dispersing additive with a wide variety of binders.

The synthesis of the phosphoric esters of the invention which are useful for forming salts of the addition compounds of the invention is described in Houben-Weyl "Methoden der organischen Chemie" Volume XII/2, 4th edition, p. 143 ff.

The degree of salt formation (which is intended to denote in this context the ratio between acid equivalents and amine equivalents) is preferably between 0.1 and 1 and more preferably between 0.5 and 1, since the last-mentioned products possess the broadest usefulness for different binders and solids. Depending on the solid to be dispersed, products with a high or with a low degree of salt formation can be used. For example, when dispersing acidic grades of carbon black, salt-forming components with excellent dispersing quality can be used which have a high excess of basic groups: that is, in which the epoxide-polyoxyalkyleneamine adduct has not been completely converted to a salt with the corresponding phosphoric ester. The products which have not been fully converted into salt form are useful, for applications where the products have an excess of acid relative to the amine equivalent: for example, when the solids used for dispersing are themselves basic.

In a proportion of up to 20%, based on the total amount of the substances used, it is also possible to employ acidic poly(meth)acrylates containing carboxylic acid groups and/or phosphoric acid groups as a salt-forming component.

Besides the addition compounds of the invention which have been converted into salts, it is also possible for the amino groups to be present in quaternized form. Quaternization takes place in the manner familiar to the person skilled in the art, using alkyl or aralkyl halides, for example, with halocarboxylic esters or with epoxides. Such an embodiment is preferable, for example, when amino groups or acidic groups are disruptive to the binder system into which the pigment concentrates are incorporated.

One preferred embodiment of the products of the invention is represented by reactions with reactants based on polyglycidyl ethers of polyhydric phenols with polyoxyalkyleneamines containing ethylene oxide and/or propylene oxide units in the polyether chain, and the phosphoric ester salts thereof. These compounds are preferred because the addition compounds of the invention based on polyhydric phenols are distinguished by high compatibility with numerous binders.

Polyhydric phenols are compounds which are described in WO 96/20971 (page 16 line 15 to page 17 line 18).

Polyoxyalkyleneamines are disclosed in WO 96/20971 page 7, line 22 to page 10, line 17, as compounds which on the one hand have primary and/or secondary amino group and on the other contain reaction products of alkylene oxides as structural units. Alkylene oxides used can be, for example, ethylene oxide, propylene oxide, butylene oxide, styrene oxide and the like, or mixtures thereof. In accordance with the definition given above, polyoxyalkylenemonoamines should be understood as being polyoxyalkyleneamines which carry on average only one primary or secondary amino group per molecule.

A preferred embodiment of the products of the invention is prepared from reactants based on bisphenol A epoxides with polyoxyalkyleneamines containing ethyl oxide and/or propylene oxide units in the polyether chain, and the phosphoric ester salts thereof. These compounds are particularly preferred because the addition compounds of the invention based on bisphenol A epoxides are distinguished by particularly high compatibility with numerous binders.

Another preferred embodiment of the products of the invention is prepared from reactions of reactants based on novolaks with polyoxyalkyleneamines containing ethylene oxide and/or propylene oxide units in the polyether chain, and the phosphoric ester salts thereof. These addition compounds and their salts also exhibit high compatibility with different binder systems.

Non-limiting examples of suitable polyoxyalkyleneamines are products known to the person skilled in the art as Jeffamines available from Huntsman (earlier produced and sold by Texaco) or mixtures of different Jeffamines, since products of this kind produce a particularly sharp reduction in the viscosity of the pigment pastes prepared.

Another preferred representative of the addition compounds of the invention are polyepoxides which are reacted with polyoxyalkyleneamines carrying a primary amino group and in which subsequently between 10 and 50% of the secondary amino groups formed have been reacted with fatty acids such as stearic acid, for example. Particularly preferred representatives in this class are addition compounds which carry a high fraction of unsaturated fatty acids such as oleic acid, linoleic acid and linolenic acid, for example, since compounds of this kind can be incorporated, for example, into alkyd-based binders and are highly compatible with numerous binders.

When polyoxyalkyleneamines having a primary amino function are used it is possible for this amino function to be modified—preferably before, but also after the reaction with the epoxide group—with acrylic esters, for example, in a Michael reaction. If the primary amino function is modified prior to the reaction with the epoxide group the rule is that the Michael reaction can be carried out only singly, i.e., with formation of a secondary amino group.

Furthermore, when using polyoxyalkyleneamines containing a primary amino function, the secondary amino function produced after the reaction with the epoxide group can be furrher reacted with monoisocyanates to form the corresponding urea derivative.

In addition to the preferred polyoxyalkylenemonoamines, it is also possible to use a small proportion of polyoxyalkyleneamines containing two or more amino groups per molecule. Such compounds can be used to increase the molecular weight of the addition compounds of the invention, which is advantageous for certain applications. The limit to the use of polyoxyalkyleneamines containing two or more amino groups per molecule is reached when there is irreversible crosslinking of the reaction mixture.

The addition compounds of the invention and their phosphoric ester salts can be used not only without solvent but also in suitable solvents, more preferably in water or in non-volatile carrier materials, as wetting agents and dispersants.

The invention also provides a process for preparing addition compounds suitable for use as wetting agents and dispersants, which is characterized in that (I) monofunctional or polyfunctional aromatic epoxides are reacted with (II) polyoxyalkylenemonoamines which have a number-average molecular weight of >400 g/mol, contain one primary or secondary amino group and have at least 4 ether oxygen atoms per molecule to form products in which from 90 to 100% of the epoxide groups in the starting material have undergone reaction and the weight fraction of aromatic groups in the addition compounds is not more than 50%, and the addition compounds contain per molecule at least one amino group on which salts can be formed, or the addition compounds are converted into salts.

The dispersants can either be prepared in organic solvents which are inert in respect of the reactive groups or can be prepared without these solvents, depending on the desired viscosity of the end product. The reaction can be conducted either by initially introducing the modified and/or unmodified epoxide and quickly adding the modified and/or unmodified polyoxyalkyleneamines or mixtures thereof or by initially introducing the amines and adding the epoxide. Subsequently, it is possible for further modifications described herein to be carried out. Although not mandatory it is preferred to carry out any salt formation with the phosphoric esters of the invention as a final reaction step. Any solvents used can also be subsequently removed or replaced by other solvents or carrier materials.

The rate of the reaction between epoxide groups and amino groups can be adjusted if desired using acidic or basic catalysts that are known to the person skilled in the art.

The degree of conversion in the reaction of the epoxide groups with the amino groups of the polyoxyalkyleneamines can be monitored, for example by way of NMR measurements or by way of HPLC measurements.

The dispersants of the invention can be used in accordance with the state of the art for known dispersants. The dispersants can be used alone or together with binders. When used in polyolefins it may be advantageous, for example, to use corresponding low molecular mass polyolefins as carrier materials together with the dispersant.

In addition to the use of the reaction products of the invention as dispersants and as dispersion stabilizers the coating of pulverulent or fibrous solids with the products of the invention is also provided by this invention. Coatings of this kind on both organic and inorganic solids are performed in a known way, as disclosed in EP-A-0 270 126, for example. The solvent or emulsion medium can either be removed or remain in the mixture with the formation of pastes. These pastes may further comprise binder fractions and also other auxiliaries and additives. In the case of pigments in particular the coating of the pigment surface may take place during or after the synthesis of the pigments, for example, by addition of the products of the invention to the pigment suspension or during or after the pigment finish.

The pigments pretreated in this way are distinguished by greater ease of incorporation in the binder and also by improved viscosity, flocculation and gloss characteristics as compared with untreated pigments.

In addition to the application as coating materials for pulverulent and fibrous solids described above, the dispersants of the invention can also be employed as viscosity reducers and compatibilizers in synthetic resins. Examples of such synthetic resins are the systems known as sheet moulding compounds (SMC) and bulk moulding compounds (BMC), which consist of unsaturated polyester resins with a high filler and fibre content. Their preparation and processing is described by way of example in DE-A-36 43 007. In order to obtain high stiffness, good surface quality and properties of flame retardancy (in the case of fillers such as $Al(OH)_3$ or $Mg(OH)_2$, for example) it is necessary to fill these systems to a high level with fillers and fibres, which leads to a sharp rise in the viscosity of the SMC and BMC mixtures and to problems associated with the wetting of the fibres. A further problem associated with SMC and BMC synthetic resin mixtures is that often polystyrene (PS) is added to the formulation in order to reduce contraction during the processing operation. Polystyrene is incompatible with the unsaturated polyester resins used, and separation of the components occurs. Through the use of the products of the invention it is possible to lower the viscosity of the resin/filler mixtures sharply, so that a higher filling level is possible, which is beneficial for the mechanical properties, the surface quality and, when using $Al(OH)_3$ or $Mg(OH)_2$, the flame retardancy. In the case of the use of polystyrene-filled SMC or BMC mixtures it is possible for the additives of the invention, owing to their effective dispersing qualities, to bring about compatibilization between polystyrene and unsaturated polyester resin, thereby increasing the storage stability and processing reliability of such mixtures.

The dispersants of the invention are used in an amount of from 0.5 to 100% by weight preferably, based on the solid to be dispersed. For the dispersion of specific solids it is nevertheless entirely possible that substantially higher amounts of the dispersants are required.

The amount of dispersant is essentially dependent on the surface to be occupied on the solid to be dispersed. Carbon black, for example, requires substantially greater quantities of dispersant than, say, $TiO_2$. Examples of pigments or fillers can be found in EP-A-0 270 126. Further examples are new developments especially in the field of organic pigments, such as the class of the diketo-pyrrolopyrroles, but also magnetic pigments based for example on pure iron or mixed oxides. Additionally it is also possible to disperse mineral fillers, such as calcium carbonate or calcium oxide, and also flame retardants, such as aluminium hydroxide or magnesium hydroxide, for example. Dulling agents such as silicas, for example, can likewise be dispersed and stabilized to outstanding effect.

EXAMPLES

The invention is further illustrated by the examples below. Unless specified otherwise, parts are by weight and percentages are by weight. In the case of molecularly non-uniform substances the stated molecular weights are averages of the numerical average.

Example 1

20 parts of Epikote 1001 are mixed with 44 parts of Jeffamine M 1000 and the mixture is heated at 140° C. in a nitrogen atmosphere for about 4 hours until the epoxide groups are no longer detectable in, for example, a nuclear magnetic resonance (NMR) experiment. The composition of the reaction solution was chosen so that one mol of primary amino groups was used per mol of epoxide groups. A yellowish, clear, viscous reaction solution is obtained. The product crystallizes out after a certain time and for use as a wetting agent and dispersant can be employed either in the hot state or diluted in appropriate solvent.

Epikote 1001 is a commercial product of Shell AG. It is a relatively high molecular mass, solid epoxy resin based on bisphenol A.

Examples 2-4

Using the method of example 1, further epoxides were reacted with amines. Table 1 summarizes these experiments. For these products as well the ratios between (poly)epoxide and amine were chosen so that amino groups and epoxide groups were used in equal molar proportions. In order to ensure this ratio the epoxide equivalent weight was determined for each of the (poly)epoxides and the amine number for each of the amines.

TABLE 1

| Example No. | Amount of epoxide used | Amount of amine used |
|---|---|---|
| Example 2 | 20 parts Epikote 828 | 99.4 parts Jeffamine M 2070 |
| | | 99.4 parts Jeffamine M 2005 |
| Example 3 | 30 parts Epoxy-Novolak 431 | 160.3 parts Jeffamine M 2070 |
| | | 160.3 parts Jeffamine M 2005 |
| Example 4 | 16 parts Epikote 828 | 176.2 parts Jeffamine M 2005 |

Epoxy-Novolak 431 is a commercial product from Dow Deutschland Inc. It is a liquid epoxy novolak.

Jeffamine M2005 and Jeffamine M 2070 are commercial products from Huntsman Petrochemical Corporation. They are polyoxyalkylenemonoamines based on ethylene oxide/propylene oxide.

Example 5

From 30 parts of the reaction product from example 2, which has an amine number (AmN) of 24 mg KOH/g, a salt is formed at about 60° C. with 6.4 parts of a phosphoric monoester $(HO)_2PO(OR^1)$ where $R^1$=butoxypolypropylene glycol (AcN~112.5 mg KOH/g; referred to below as phosphoric ester A). A clear, viscous, brown reaction solution is obtained. The degree of salt formation in this example has a value of 1.

TABLE 2

| Example No. | Amount of epoxide/amine adduct used | Amount of phosphoric ester used | Degree of salt formation |
|---|---|---|---|
| Example 6 | 40 parts of the epoxide/amine adduct from Ex. 2 | 9.6 parts of phosphoric ester B** | 1 |
| Example 7 | 40 parts of the epoxide/amine adduct from Ex. 1 | 14.7 parts of phosphoric ester B** | 1 |
| Example 8 | 40 parts of the epoxide/amine adduct from Ex. 2 | 4.8 parts of phosphoric ester B** | 0.5 |
| Example 9 | 40 parts of the epoxide/amine adduct from Ex. 2 | 19.2 parts of phosphoric ester B** | 2 |
| Example 10 | 40 parts of the epoxide/amine adduct from Ex. 3 | 8.9 parts of phosphoric ester A | 1 |

**phosphoric ester B is a phosphoric monoester $(HO)_2PO(OR^1)$ with $R^1$ = butoxypoly(ethylene glycol-co-propylene glycol) (AcN~100 mg KOH/g)

Example 11

200 parts of the epoxide-amine adduct from example 2 are mixed with 24.6 parts of tall oil fatty acid (acid number about 195 mg KOH/g). In this proportion the number of the amino groups is equal to the number of the carboxyl groups. The mixture is mixed with 0.4 g of para-toluenesulphonic acid catalyst and heated to 160° C. with stirring. Water of reaction formed is removed from the reaction mixture by means of a gentle stream of nitrogen. After about 3.5 h under these reaction conditions, the reaction temperature was raised to 200° C. After a further 6.5 hours the amine number of the reaction solution has fallen to a figure of about 11 mg KOH/g (theoretical initial level about 22 mg KOH/g). Thus about 50% of all the amino groups have undergone amidation with the tall oil fatty acid; the remainder of the amino groups are in salt form. A yellowish brown, clear reaction solution is obtained.

Example 12

200 parts of the epoxide-amine adduct from example 2 are reacted with 11.1 parts of butyl acrylate in a Michael reaction. For this purpose 0.25 part of Anullex BHT is added to the mixture, which is stirred at 100° C. in a nitrogen atmosphere for about 12 h until the solids of the reaction mixture is >99%. Residues of butyl acrylate are removed by vacuum distillation. A clear, reddish yellow reaction product is obtained.

Anullex BHT is a commercial product from Archimica, and acts as a stabilizer to prevent free-radical chain reactions.

Example 13

From 25 parts of the reaction product from example 12, with an AmN of 29.1 mg KOH/g, a salt is formed with 6.7 parts of the phosphoric ester B from example 6. The degree of salt formation in the case of this product has a value of 1. A clear, reddish yellow reaction product is obtained.

Comparative Examples 14-16 (Not Inventive)

In comparative examples 14 and 15 epoxide adducts were prepared with non-inventive aliphatic epoxides, in order to illustrate the superior efficacy of the adducts of the invention. With these products as well the ratios between epoxide and amine were chosen so that amino groups and epoxide groups were used in equal molar proportions. In order to ensure this ratio the epoxide equivalent weight was determined in the case of each (poly)epoxide and the amine number was determined in the case of each of the amines.

Comparative Example 14

20 parts of Grilonit RV 1814 were reacted by the method of example 1 with 124.7 parts of Jeffamine M 2070. A clear, yellow reaction mixture is obtained. Grilonit RV 1814 is a commercial product from Ems Primid. It is a C13/C15 alkyl glycidyl ether.

Comparative Example 15

30 parts of the reaction product from example 14, which has an amine number (AmN) of 23.6 mg KOH/g, are admixed at approximately 60° C. with 6.4 parts of the phosphoric monoester A. The degree of salt formation in this reaction has a value of 1. A clear, brown reaction mixture is obtained.

Comparative Example 16

15 parts of glycidyl methacrylate (Mn=142 g/mol) were reacted by the method of example 1 with 197.6 parts of Jeffamine M 2070. A slightly turbid, colourless to yellow reaction solution is obtained.

In comparative examples 17 and 18 epoxide adducts were prepared in analogy to patent DE 36 23 297, since such products are chemically closest to the inventive products claimed and so define the state of the art. Since the products protected in patent DE 36 23 297 are often not water-soluble or water-emulsifiable, salts of these products with the phosphoric esters of the invention were formed as well in order thereby to give water-soluble or water-emulsifiable products which can then be tested accordingly.

Comparative Example 17

28.2 parts of oleylamine, 12.6 parts of amino-propylimidazole and 1.4 g of salicylic acid (catalyst) are introduced in 251.2 parts of 2-butoxyethanol as solvent and this initial charge is heated to 70° C. Over the course of 1 minute, 37.6 g of Epikote 828 in 68 g of 2-butoxyethanol are added with thorough stirring. The reaction solution is then heated to 85° C. and stirred at that temperature for 4 h. A clear, yellow reaction solution is obtained which has a solids content of about 20% and an amine number of about 41.5 mg KOH/g.

Comparative Example 18

From 30 parts of the reaction product from comparative example 17 a salt is formed with 11.3 parts of phosphoric ester A. A clear, yellow reaction product is obtained which has a solids content of about 42%.

2. Performance Examples

In order to test the efficacy of the dispersants of the invention, pigment pastes were prepared with different addition products and with the analogues thereof in the form of salts with phosphoric esters. In parallel to this, pigment pastes were prepared as well with the products from the non-inventive, comparative examples 14-18.

The pigment pastes prepared were subjected to performance analysis by incorporating the pigment pastes into different binder systems. Following application and curing of the finished pigmented paints, colour strength measurements were then performed on the drawdowns.

To prepare the pigment pastes, 25 parts of the carbon black pigment Spezialschwartz 100 from Degussa, 0.2% of Byk 017 (defoamer from Byk-Chemie GmbH), 0.3% of Crayvallac Super (rheological additive from Lubrizol Coating Additives GmbH), the respective wetting agent and dispersant, and water were premixed. The amount of additive was such that 40%, based on the amount of carbon black, of the active substance of the additive was used. The mixture is then made up to 100 parts with demineralized water. This mixture is admixed with 100 parts of glass beads (1 mm in diameter) and dispersed by means of a polypropylene disk with a diameter of 40 mm at a peripheral speed of 21 m/s at 40° C. for 1 h in a vertical bead mill from Getzmann (Dispermat CV).

To test the quality of dispersion, 3% of the carbon black concentrate prepared by the method described above is mixed for 10 minutes in a Skandex shaker with commercially customary white paints.

The finished paints are then applied in a wet film thickness of 100 μm to contrast charts (No. 2853) from Byk-Gardner.

After the paints have dried the coatings are evaluated visually and using a colorimeter from Byk-Gardner (Colour Guide, Sphere, viewing angle 8°).

The commercially available white paints used as comparison materials were as follows:
1. Dulux white interior paint (ICI-Paints Deco GmbH; water-thinnable acrylate paint)
2. Sikkens Setaliet BW (Akzo Nobel Decorative Coatings; Silicate masonry paint)
3. Sikkens Rubbol AZ, high-gloss paint, base 09 (Akzo Nobel Decorative Coatings; alkyd resin paint)

The white paints listed were selected since these systems cover very different types of paint and polarities. This selection is intended to underline the suitability of the additives of the invention for use as wetting agents and dispersants for universal tinting pastes.

Table 3 summarizes the results of the colour strength measurements. For this purpose the colour strength of the paints prepared with the product from example 2 was set arbitrarily at a figure of 100%: lower figures indicate a deterioration in the colour strength, higher figures an improvement in the colour strength.

TABLE 3

| Product from | Colour strength measurement Dulux interior paint | Colour strength measurement Setaliet masonry paint | Colour strength measurement Rubbol AZ alkyd resin |
|---|---|---|---|
| Example 1 | 90% | 87% | 95% |
| Example 2 | 100% | 100% | 100% |
| Example 6 | 101% | 98% | 105% |
| Example 13 | 92% | 90% | 81% |
| Comp. Ex. 14 | 88% | 77% | 61% |
| Comp. Ex. 15 | 83% | 61% | 60% |
| Comp. Ex. 16 | *** | *** | *** |
| Comp. Ex. 17 | *** | *** | *** |
| Comp. Ex. 18 | *** | *** | *** |

***In these cases it was impossible to measure the colour strength, since it was not possible to prepare the carbon black concentrates from the corresponding products: before or during dispersion there was an excessively sharp rise in the viscosity of the millbase or the millbase was excessively inhomogeneous, thereby rendering proper dispersion impossible. Some products were totally insoluble in water. The same behaviour was shown by products from the comparative examples from which salts with phosphoric esters were formed.

As can be seen from table 3, only the pigmented paints produced with the products of the invention lead to strongly coloured coatings free from defects. A similar picture emerges for pigmented paints produced with other dispersants of the invention, and also those produced with other pigments.

With the comparative products it was impossible in the majority of cases to carry out dispersion, since either during the premixing or else during the actual dispersing operation there was excessive thickening of the millbase or excessive incompatibility with water. The comparative products with which pigment pastes could be produced gave markedly poorer values in the colour measurements, in the subsequent mixtures with the white paints, as compared with the pigment pastes containing the products of the invention. In many cases, moreover, there were defects in the paint film owing to the formation of coarse particles by agglomeration of the pigment particles with the binder of the white paints used.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

The invention claimed is:

1. An addition compound suitable for use as a wetting agent or dispersant and prepared by reacting:
   (I) a monofunctional or polyfunctional aromatic epoxide; with
   (II) a polyoxyalkylenemonoamine having a number-average molecular weight of >400 g/mol, one primary or secondary amino group, and at least 4 ether oxygen atoms per molecule; wherein more than 95% of the epoxide groups of the epoxide (I) are reacted with the polyoxyalkylenemonoamine (II); the weight fraction of aromatic groups in the addition compound is less than 50%; and the addition compound contains at least one amino group per molecule on which salts can be formed.

2. An ester salt of phosphoric acid comprising the addition compound of claim 1, said phosphoric acid having the formula:

$$(HO)_{3-n}PO(OR^1)_n$$

wherein: n is 1 or 2; and $R^1$ is selected from the group consisting of: a straight-chain or branched alkyl radial having from 5 to 20 carbon atoms; an aryl or aralkyl radical having from 6 to 26 carbon atoms; a radical of an oxalkylated alcohol with a number-average molecular weight of between 100 and 5000 g/mol; a radical with at least one carboxylic ester group and a number-average molecular weight of between 400 and 5000 g/mol; and a radical with a urethane group and a number-average molecular weight of between 100 and 5000 g/mol.

3. The addition compound of claim 1, wherein the epoxide (I) has been reacted with a polyoxyalkylenemonoamine (II) comprising ethylene oxide or propylene oxide units, in the polyether chain.

4. The addition compound of claim 1, wherein from 10 to 50% of secondary amino groups formed by the reaction of the epoxide (I) with the polyoxyalkylenemonoamine (II) have been further reacted with fatty acids.

5. A method for dispersing pigments or fillers in coating materials comprising preparing a composition comprising the addition compound of claim 1 and the pigments or fillers prior to preparing the coating materials.

6. The method of claim 5, wherein the pigments or fillers are coated with the addition compound.

7. A composition comprising a pigments or fillers coated with the addition compound of claim 1.

8. A pigment paste comprising pigments, binders and the addition compound of claim 1.

9. A process for preparing an addition compound suitable for use as a wetting agent or dispersant, wherein:
(I) a monofunctional or polyfunctional aromatic epoxide is reacted with;
(II) a polyoxyalkylenemonoamine, wherein the polyoxyalkylenemonoamine has a number-average molecular weight of >400 g/mol, contains one primary or secondary amino group, and has at least 4 ether oxygen atoms per molecule;
to form an addition compound in which more than 95% of the epoxide groups in epoxide (I) have undergone a reaction with the polyoxyalkylenemonoamine (II); said addition compound having a weight fraction of aromatic groups of not more than 50%; and said addition compound contains at least one amino group per molecule on which salts can be formed.

10. The process of claim 9, wherein the addition compound is converted into a salt.

11. The process of claim 10, wherein the addition compound is converted into a salt of phosphoric acid, said phosphoric acid having the formula:

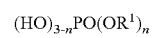

$(HO)_{3-n}PO(OR^1)_n$ wherein: n is 1 or 2; and $R^1$ is selected from the group consisting of: a straight-chain or branched alkyl radial having from 5 to 20 carbon atoms; an aryl or aralkyl radical having from 6 to 26 carbon atoms; a radical of an oxalkylated alcohol with a number-average molecular weight of between 100 and 5000 g/mol; a radical with at least one carboxylic ester group and a number-average molecular weight of between 400 and 5000 g/mol; and a radical with a urethane group and a number-average molecular weight of between 100 and 5000 g/mol.

* * * * *